(12) United States Patent
Remaley et al.

(10) Patent No.: US 10,860,102 B2
(45) Date of Patent: Dec. 8, 2020

(54) GUIDE FOR SUPPORTING FLEXIBLE ARTICULATING STRUCTURE

(71) Applicant: Microsoft Technology Licensing, LLC, Redmond, WA (US)

(72) Inventors: Jacquelin Leah Remaley, Redmond, WA (US); Sang Ho Yoon, Redmond, WA (US); James David Holbery, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/406,202

(22) Filed: May 8, 2019

(65) Prior Publication Data
US 2020/0356168 A1 Nov. 12, 2020

(51) Int. Cl.
*G06F 3/01* (2006.01)
*G02B 27/01* (2006.01)

(52) U.S. Cl.
CPC ......... *G06F 3/014* (2013.01); *G02B 27/0172* (2013.01); *G06F 3/016* (2013.01)

(58) Field of Classification Search
None
See application file for complete search history.

(56) References Cited

U.S. PATENT DOCUMENTS

| | | |
|---|---|---|
| 2,897,425 A | 7/1959 | Waring et al. |
| 4,753,442 A | 6/1988 | Bland |
| 4,987,332 A | 1/1991 | Yamamoto et al. |
| 5,173,834 A | 12/1992 | Sogoh |

(Continued)

FOREIGN PATENT DOCUMENTS

| | | |
|---|---|---|
| CN | 100998527 A | 7/2007 |
| CN | 106726027 A | 5/2017 |

(Continued)

OTHER PUBLICATIONS

Delph, et al., "Modeling and Design of a Tendon Actuated Soft Robotic Exoskeleton for Hemiparetic Upper Limb Rehabilitation", In Proceedings of 37th Annual International Conference of the IEEE Engineering in Medicine and Biology Society (EMBC), Aug. 25, 2015, pp. 3889-3892.

(Continued)

*Primary Examiner* — Joseph R Haley
(74) *Attorney, Agent, or Firm* — Alleman Hall Creasman & Tuttle LLP (57) ABSTRACT

One example provides a system for selectively restricting motion of an articulable joint, the system comprising a base having a first portion configured to be positioned at a first side of the articulable joint and a second portion configured to be positioned at a second side of the articulable joint, a clutch mechanism comprising a flexible portion having a first end coupled to the first portion of the base and a second end coupled to the second portion of the base, and a guide coupled to the base, the guide comprising a support surface that supports the flexible portion between the first end and the second end as the flexible portion moves during articulation of the articulable joint, the support surface of the guide comprising an angular transition in a dimension transverse to a travel direction of the flexible portion as a function of distance along the travel direction.

20 Claims, 6 Drawing Sheets

(56) References Cited

U.S. PATENT DOCUMENTS

| | | |
|---|---|---|
| 5,184,319 A | 2/1993 | Kramer |
| 5,429,140 A | 7/1995 | Burdea et al. |
| 5,516,249 A | 5/1996 | Brimhall |
| 5,631,861 A | 5/1997 | Kramer |
| 6,128,004 A | 10/2000 | McDowall et al. |
| 6,413,229 B1 | 7/2002 | Kramer et al. |
| 6,524,681 B1 | 2/2003 | Seitz et al. |
| 6,790,308 B2 | 9/2004 | Murphy et al. |
| 6,809,462 B2 | 10/2004 | Pelrine et al. |
| 6,966,882 B2 | 11/2005 | Horst |
| 7,046,151 B2 | 5/2006 | Dundon |
| 7,056,297 B2 | 6/2006 | Dohno et al. |
| 7,166,953 B2 | 1/2007 | Heim et al. |
| 7,250,935 B2 | 7/2007 | Kubota et al. |
| 7,390,157 B2 | 6/2008 | Kramer |
| 7,407,895 B2 | 8/2008 | Kunitake et al. |
| 7,481,782 B2 | 1/2009 | Scott et al. |
| 7,537,573 B2 | 5/2009 | Horst |
| 7,545,349 B2 | 6/2009 | Yamada |
| 7,551,419 B2 | 6/2009 | Pelrine et al. |
| 7,920,124 B2 | 4/2011 | Tokita et al. |
| 8,029,414 B2 | 10/2011 | Ingvast et al. |
| 8,049,772 B2 | 11/2011 | Lipton et al. |
| 8,058,853 B2 | 11/2011 | Murota |
| 8,138,895 B2 | 3/2012 | Kato et al. |
| 8,160,743 B2 | 4/2012 | Birkenbach et al. |
| 8,164,232 B2 | 4/2012 | Kornbluh et al. |
| 8,255,079 B2 | 8/2012 | Linn et al. |
| 8,325,458 B2 | 12/2012 | Prahlad et al. |
| 8,330,590 B2 | 12/2012 | Poupyrev et al. |
| 8,362,882 B2 | 1/2013 | Heubel et al. |
| 8,665,241 B2 | 3/2014 | Heubel et al. |
| 8,833,826 B2 | 9/2014 | Garcia et al. |
| 8,860,336 B2 | 10/2014 | Anderson et al. |
| 8,861,171 B2 | 10/2014 | Prahlad et al. |
| 8,882,285 B2 | 11/2014 | Walsh |
| 8,964,351 B2 | 2/2015 | Horinouchi |
| 8,998,831 B2 | 4/2015 | Sankai |
| 9,093,926 B2 | 7/2015 | Prahlad et al. |
| 9,120,220 B2 | 9/2015 | Bergelin et al. |
| 9,148,074 B2 | 9/2015 | Boughtwood |
| 9,170,288 B2 | 10/2015 | O'Brien et al. |
| 9,180,866 B2 | 11/2015 | Helmer et al. |
| 9,266,233 B2 | 2/2016 | Kornbluh et al. |
| 9,301,563 B2 | 4/2016 | Hardy et al. |
| 9,375,382 B2 | 6/2016 | Fausti et al. |
| 9,401,668 B2 | 7/2016 | Prahlad et al. |
| 9,403,056 B2 | 8/2016 | Weinberg et al. |
| 9,403,272 B2 | 8/2016 | Kornbluh et al. |
| 9,417,693 B2 | 8/2016 | Seth |
| 9,427,864 B2 | 8/2016 | Kornbluh et al. |
| 9,529,433 B2 | 12/2016 | Shankar et al. |
| 9,606,624 B2 | 3/2017 | Cruz-Hernandez et al. |
| 9,710,060 B2 | 7/2017 | McMillen et al. |
| 9,846,482 B2 | 12/2017 | Seth |
| 9,921,609 B2 | 3/2018 | Levesque et al. |
| 9,931,235 B2 | 4/2018 | Summer et al. |
| 9,939,468 B1 | 4/2018 | Dyszel |
| 9,950,422 B2 | 4/2018 | Kornbluh et al. |
| 9,983,672 B2 | 5/2018 | Olien et al. |
| 10,012,276 B2 | 7/2018 | Eckerle et al. |
| 10,013,062 B1 | 7/2018 | Corson et al. |
| 10,025,387 B2 | 7/2018 | Keller et al. |
| 10,055,019 B2 | 8/2018 | Beran |
| 10,055,022 B2 | 8/2018 | Appleyard et al. |
| 10,082,872 B2 | 9/2018 | Cruz-Hernandez et al. |
| 10,082,875 B1 | 9/2018 | Kim et al. |
| 10,104,923 B2 | 10/2018 | Howland et al. |
| 10,105,839 B2 | 10/2018 | Kornbluh et al. |
| 10,137,362 B2 | 11/2018 | Buchanan et al. |
| 10,197,459 B2 | 2/2019 | Keller et al. |
| 10,228,396 B2 | 3/2019 | Gisby et al. |
| 10,248,200 B2 | 4/2019 | Cohen et al. |
| 10,275,025 B2 | 4/2019 | Black et al. |
| 10,281,982 B2 | 5/2019 | Keller et al. |
| 10,317,998 B2 | 6/2019 | Holbery et al. |
| 10,355,624 B2 | 7/2019 | Majidi et al. |
| 10,366,583 B2 | 7/2019 | Khoshkava et al. |
| 10,372,213 B2 | 8/2019 | Keller et al. |
| 10,381,143 B2 | 8/2019 | Khoshkava et al. |
| 10,423,227 B2 | 9/2019 | Gu |
| 10,427,293 B2 | 10/2019 | Asbeck et al. |
| 10,433,367 B2 | 10/2019 | Pratt et al. |
| 10,437,335 B2 | 10/2019 | Daniels |
| 10,466,784 B2 | 11/2019 | Cohen et al. |
| 10,474,236 B1 | 11/2019 | Stewart et al. |
| 10,514,759 B2 | 12/2019 | Taylor et al. |
| 10,521,947 B2 | 12/2019 | Yokokawa |
| 10,528,138 B2 | 1/2020 | Keller et al. |
| 10,543,110 B2 | 1/2020 | Piercy et al. |
| 10,561,565 B2 | 2/2020 | John et al. |
| 10,564,722 B2 | 2/2020 | Keller et al. |
| 10,572,011 B2 | 2/2020 | Holbery |
| 10,572,014 B2 | 2/2020 | Keller et al. |
| 10,595,618 B2 | 3/2020 | Wang et al. |
| 10,603,190 B2 | 3/2020 | Mateus Dias Quinaz |
| 10,627,783 B2 | 4/2020 | Rothkopf et al. |
| 10,663,016 B2 | 5/2020 | Schmitz et al. |
| 2002/0130673 A1 | 9/2002 | Pelrine et al. |
| 2003/0125781 A1 | 7/2003 | Dohno et al. |
| 2004/0084261 A1 | 5/2004 | Burgoon et al. |
| 2004/0102723 A1 | 5/2004 | Horst |
| 2004/0174337 A1 | 9/2004 | Kubota et al. |
| 2005/0012485 A1 | 1/2005 | Dundon |
| 2006/0004307 A1 | 1/2006 | Horst |
| 2006/0094989 A1 | 5/2006 | Scott et al. |
| 2006/0115348 A1 | 6/2006 | Kramer |
| 2006/0152098 A1 | 7/2006 | Horst et al. |
| 2006/0261516 A1 | 11/2006 | Kunitake et al. |
| 2007/0016265 A1 | 1/2007 | Davoodi et al. |
| 2007/0129846 A1 | 6/2007 | Birkenbach et al. |
| 2007/0195482 A1 | 8/2007 | Muka et al. |
| 2008/0059131 A1 | 3/2008 | Tokita et al. |
| 2008/0089002 A1 | 4/2008 | Pelrine et al. |
| 2008/0153590 A1 | 6/2008 | Ombrellaro et al. |
| 2009/0102620 A1 | 4/2009 | Kato et al. |
| 2010/0007240 A1 | 1/2010 | Kornbluh et al. |
| 2010/0041521 A1 | 2/2010 | Ingvast et al. |
| 2010/0045251 A1 | 2/2010 | Murota |
| 2010/0085169 A1 | 4/2010 | Poupyrev et al. |
| 2010/0141407 A1 | 6/2010 | Heubel et al. |
| 2010/0318006 A1 | 12/2010 | Horst |
| 2011/0071664 A1 | 3/2011 | Linn et al. |
| 2011/0101823 A1 | 5/2011 | Anderson et al. |
| 2011/0187637 A1 | 8/2011 | Nichols |
| 2011/0193362 A1 | 8/2011 | Prahlad et al. |
| 2011/0234414 A1 | 9/2011 | Ojeda et al. |
| 2012/0029399 A1 | 2/2012 | Sankai |
| 2012/0053498 A1 | 3/2012 | Horst |
| 2012/0086366 A1 | 4/2012 | Anderson et al. |
| 2012/0109025 A1 | 5/2012 | Weinberg et al. |
| 2012/0154974 A1 | 6/2012 | Bhatnagar et al. |
| 2012/0182720 A1 | 7/2012 | Walsh |
| 2013/0010398 A1 | 1/2013 | Prahlad et al. |
| 2013/0072829 A1 | 3/2013 | Fausti et al. |
| 2013/0155020 A1 | 6/2013 | Heubel et al. |
| 2013/0226350 A1 | 8/2013 | Bergelin et al. |
| 2013/0242455 A1 | 9/2013 | Prahlad et al. |
| 2013/0285577 A1 | 10/2013 | O'brien et al. |
| 2013/0294875 A1 | 11/2013 | Prahlad et al. |
| 2013/0330162 A1 | 12/2013 | Horinouchi |
| 2014/0035306 A1 | 2/2014 | Garcia et al. |
| 2014/0162598 A1 | 6/2014 | Villa-Real |
| 2014/0215684 A1 | 8/2014 | Hardy et al. |
| 2014/0277739 A1 | 9/2014 | Kornbluh et al. |
| 2015/0123647 A1 | 5/2015 | Gisby et al. |
| 2015/0266180 A1 | 9/2015 | Kornbluh et al. |
| 2015/0266181 A1 | 9/2015 | Kornbluh et al. |
| 2015/0321339 A1 | 11/2015 | Asbeck et al. |
| 2016/0004308 A1 | 1/2016 | Cruz-hernandez et al. |
| 2016/0025459 A1 | 1/2016 | Kwint et al. |
| 2016/0030835 A1 | 2/2016 | Argiro |
| 2016/0070347 A1 | 3/2016 | Mcmillen et al. |
| 2016/0101516 A1 | 4/2016 | Kornbluh et al. |

(56) References Cited

U.S. PATENT DOCUMENTS

| | | |
|---|---|---|
| 2016/0101517 A1 | 4/2016 | Kornbluh et al. |
| 2016/0120734 A1 | 5/2016 | Ishikawa et al. |
| 2016/0124548 A1 | 5/2016 | Cherif et al. |
| 2016/0162022 A1 | 6/2016 | Seth |
| 2016/0187973 A1 | 6/2016 | Shankar et al. |
| 2016/0187977 A1 | 6/2016 | Cruz-hernandez et al. |
| 2016/0209448 A1 | 7/2016 | Currie et al. |
| 2016/0213548 A1 | 7/2016 | John et al. |
| 2016/0224115 A1 | 8/2016 | Olien et al. |
| 2016/0259417 A1 | 9/2016 | Gu |
| 2016/0278948 A1 | 9/2016 | Piercy et al. |
| 2016/0342207 A1 | 11/2016 | Beran |
| 2016/0361179 A1 | 12/2016 | Mateus Dias Quinaz |
| 2016/0363887 A1 | 12/2016 | Nodera et al. |
| 2016/0363997 A1 | 12/2016 | Black et al. |
| 2016/0378071 A1 | 12/2016 | Rothkopf |
| 2017/0014111 A1 | 1/2017 | Hulseman et al. |
| 2017/0038839 A1 | 2/2017 | Seth |
| 2017/0055596 A1 | 3/2017 | Colby et al. |
| 2017/0061753 A1 | 3/2017 | Khoshkava et al. |
| 2017/0131769 A1 | 5/2017 | Keller et al. |
| 2017/0131770 A1 | 5/2017 | Keller et al. |
| 2017/0160807 A1 | 6/2017 | Keller et al. |
| 2017/0165567 A1 | 6/2017 | Walters |
| 2017/0168565 A1 | 6/2017 | Cohen et al. |
| 2017/0176267 A1 | 6/2017 | Keller et al. |
| 2017/0185152 A1 | 6/2017 | Keller et al. |
| 2017/0212589 A1 | 7/2017 | Domenikos et al. |
| 2017/0222576 A1 | 8/2017 | Majidi et al. |
| 2017/0248272 A1 | 8/2017 | Ullrich et al. |
| 2017/0273374 A1 | 9/2017 | Howland et al. |
| 2017/0319950 A1 | 11/2017 | Buchanan et al. |
| 2017/0371416 A1* | 12/2017 | Zeitler .................. G06F 3/016 |
| 2018/0039302 A1 | 2/2018 | Levesque et al. |
| 2018/0055713 A1 | 3/2018 | Cromie et al. |
| 2018/0056104 A1 | 3/2018 | Cromie et al. |
| 2018/0077976 A1 | 3/2018 | Keller et al. |
| 2018/0081436 A1 | 3/2018 | Keller et al. |
| 2018/0081437 A1 | 3/2018 | Taylor et al. |
| 2018/0081439 A1 | 3/2018 | Daniels |
| 2018/0098583 A1 | 4/2018 | Keller et al. |
| 2018/0107277 A1 | 4/2018 | Keller et al. |
| 2018/0140441 A1 | 5/2018 | Poirters |
| 2018/0143687 A1 | 5/2018 | Moessinger et al. |
| 2018/0151281 A1 | 5/2018 | Khoshkava et al. |
| 2018/0153722 A1 | 6/2018 | Cromie et al. |
| 2018/0196515 A1 | 7/2018 | Appleyard et al. |
| 2018/0258562 A1 | 9/2018 | Fukuhara |
| 2018/0260052 A1 | 9/2018 | Karagozler |
| 2018/0311570 A1 | 11/2018 | Buchanan et al. |
| 2018/0314334 A1 | 11/2018 | Appleyard et al. |
| 2018/0319020 A1 | 11/2018 | Prahlad et al. |
| 2018/0324896 A1 | 11/2018 | Pratt et al. |
| 2018/0335841 A1 | 11/2018 | Rubin et al. |
| 2018/0361566 A1 | 12/2018 | Kornbluh et al. |
| 2018/0368559 A1 | 12/2018 | Wang et al. |
| 2018/0373331 A1 | 12/2018 | Holbery et al. |
| 2019/0004602 A1 | 1/2019 | Holbery |
| 2019/0101981 A1 | 4/2019 | Elias et al. |
| 2019/0101983 A1 | 4/2019 | Cohen et al. |
| 2019/0102927 A1 | 4/2019 | Yokokawa |
| 2019/0176320 A1 | 6/2019 | Smith et al. |
| 2019/0204921 A1 | 7/2019 | Goupil et al. |
| 2019/0209086 A1 | 7/2019 | Huang et al. |
| 2019/0247050 A1 | 8/2019 | Goldsmith |
| 2019/0282131 A1 | 9/2019 | Chang et al. |
| 2019/0283247 A1 | 9/2019 | Chang et al. |
| 2019/0339773 A1 | 11/2019 | Holbery et al. |
| 2019/0343707 A1 | 11/2019 | Riener et al. |
| 2019/0346938 A1 | 11/2019 | Wang et al. |
| 2019/0352808 A1 | 11/2019 | Yoon et al. |
| 2020/0012344 A1 | 1/2020 | Mcmillen et al. |
| 2020/0012345 A1 | 1/2020 | Wang et al. |
| 2020/0016363 A1 | 1/2020 | Macri et al. |
| 2020/0029635 A1 | 1/2020 | Kiemele et al. |
| 2020/0081532 A1 | 3/2020 | Yoon et al. |
| 2020/0081533 A1 | 3/2020 | Holbery et al. |

FOREIGN PATENT DOCUMENTS

| | | |
|---|---|---|
| DE | 102015113827 A1 | 2/2017 |
| EP | 0782843 A2 | 7/1967 |
| EP | 0981423 A2 | 3/2000 |
| EP | 3343325 A1 | 7/2018 |
| FI | 127459 B | 6/2018 |
| FR | 3040803 A1 | 3/2017 |
| GB | 2488760 A | 9/2012 |
| JP | H06126661 A | 5/1994 |
| JP | 2005227111 A | 8/2005 |
| WO | 2005089176 A2 | 9/2005 |
| WO | 2011116357 A2 | 9/2011 |
| WO | 2016012480 A1 | 1/2016 |
| WO | 2016057963 A1 | 4/2016 |
| WO | 2016070078 A1 | 5/2016 |
| WO | 2017199035 A1 | 11/2017 |
| WO | 2018031476 A1 | 2/2018 |
| WO | 2018059737 A1 | 4/2018 |
| WO | 2018122106 A1 | 7/2018 |

OTHER PUBLICATIONS

Xiloyannis, et al., "Preliminary Design and Control of a Soft Exosuit for Assisting Elbow Movements and Hand Grasping in Activities of Daily Living", In Journal of Rehabilitation and Assistive Technologies Engineering, vol. 4, Jan. 1, 2017, 15 Pages.

"Non Final Office Action Issued in U.S. Appl. No. 16/123,682", dated Oct. 15, 2019, 32 Pages.

"Final Office Action Issued in U.S. Appl. No. 15/968,677", dated Oct. 21, 2019, 26 Pages.

"International Search Report and Written Opinion Issued in PCT Application No. PCT/US2019/038075", dated Sep. 9, 2019, 12 Pages.

"Dupont LuxPrint 8153", Retrieved From: https://www.dupont.com/content/dam/dupont/products-and-services/electronic-and-electrical-materials/documents/prodlib/8153.pdf, Oct. 2009, 3 Pages.

"Plexus—High Performance VR/AR gloves", Retrieved from: https://web.archive.org/web/20190306150539/http:/plexus.im/, Mar. 6, 2019, 2 Pages.

"Non Final Office Action Issued in U.S. Appl. No. 15/620,672", dated Apr. 29, 2019, 54 Pages.

"Non Final Office Action Issued in U.S. Appl. No. 15/968,677", dated Apr. 29, 2019, 44 Pages.

Azambuja, Enaie, "Electroadhesive Clutch Substitutes Conventional Ones in Robotics", Retrieved from: https://www.electronicspecifier.com/robotics/electroadhesive-clutch-substitutes-conventional-ones-in-robotics, Jul. 8, 2016, 5 Pages.

Bauer, et al., "Electromechanical Characterization and Measurement Protocol for Dielectric Elastomer Actuators", In Proceedings of SPIE—The International Society for Optical Engineering, vol. 6168, Mar. 20, 2006, 2 Pages.

Bianchi, Matteo, "A Fabric-Based Approach for Wearable Haptics", In Journal of Electronics, vol. 5, Issue 3, Jul. 26, 2017, 14 Pages.

Bolzmacher, et al., "Polymer Based Actuators for Virtual Reality Devices", In Proceedings of SPIE, vol. 5385, Jul. 27, 2004, pp. 281-289.

Cassar, et al., "A Force Feedback Glove Based on Magnetorheological Fluid: Preliminary Design Issues", In Proceedings of 15th IEEE Mediterranean Electrotechnical Conference, May 2010, 7 Pages.

Choi, et al., "Wolverine: A Wearable Haptic Interface for Grasping in VR", In Proceedings of 29th Annual Symposium on User Interface Software and Technology, Oct. 16, 2016, 3 Pages.

Cohen, et al., "Virtual Reality Robotic Telesurgery Simulations using MEMICA Haptic System", In proceedings of the SPIE Smart Structures Conference, vol. 4329, Mar. 5, 2001, 7 Pages.

Diller, et al., "A lightweight, Low-Power Electroadhesive Clutch and Spring for Exoskeleton Actuation", In Proceedings of IEEE International Conference on Robotics and Automation, May 16, 2016, 8 Pages.

(56) References Cited

OTHER PUBLICATIONS

Diller, Stuart, "Demonstration: Electroadhesive Clutch", Retrieved From: https://www.youtube.com/watch?v=CufiVK76fPQ, Jul. 7, 2016, 2 Pages.
Diller, et al., "Exoskeleton Walking with a Lightweight, low-power Electroadhesive Clutch and Spring", In Proceedings of IEEE International Conference on Robotics and Automation (ICRA), Mar. 2016, 2 Pages.
Frediani, et al., "Wearable Wireless Tactile Display for Virtual Interactions with Soft Bodies", In Journal of Bioengineering and Biotechnology, vol. 2, Article 31, Sep. 2014, 7 Pages.
Gabardi, et al., "A New Wearable Fingertip Haptic Interface for the Rendering of Virtual Shapes and Surface Features", In Proceedings of the IEEE Haptics Symposium, Apr. 8, 2016, pp. 140-146.
Gallego, Jelor, "New Super-Light Exoskeleton Created to Enhance The Human Body", Retrieved From: https://futurism.com/new-super-light-exoskeleton-created-to-enhance-the-human-body, Jul. 20, 2016, 4 Pages.
Heo, et al., "Current Hand Exoskeleton Technologies for Rehabilitation and Assistive Engineering", In International Journal of Precision Engineering and Manufacturing, vol. 13, Issue 5, May 1, 2012, pp. 807-824.
Holbery, et al., "Electrostatic Slide Clutch with Bidirectional Drive Circuit", Application as Filed in U.S. Appl. No. 15/968,677, filed May 1, 2018, 36 Pages.
Kumar, et al., "MuJoCo HAPTIX: A Virtual Reality System for Hand Manipulation", In Proceedings of IEEE 15th International Conference on Humanoid Robots (Humanoids), Nov. 3, 2015, 7 Pages.
Lai, Richard, "Dexmo Exoskeleton Glove lets you Touch and Feel in VR", Retrieved From: https://www.engadget.com/2016/08/24/dexmo-exoskeleton-glove-force-feedback/, Aug. 24, 2016.
Zhang, et al., "Dielectric Elastomer Actuators for A Portable Force Feedback Device", In Proceedings of the 4th International Symposium on Haptic Interfaces for Virtual Environment and Teleoperator Systems, Mar. 25, 2006, 8 Pages.
"International Search Report and Written Opinion Issued in PCT Application No. PCT/US19/028425", dated Jul. 3, 2019, 11 Pages.
"International Search Report and Written Opinion Issued in PCT Application No. PCT/US2017/062119", dated Mar. 12, 2018, 12 Pages.
Pessina, Laure-Anne, "Ultra-light Gloves let Users "Touch" Virtual Objects", Retrieved from: https://actu.epfl.ch/news/ultra-light-gloves-let-users-touch-virtual-objects/, Oct. 15, 2018, 3 Pages.
Schorr, Samuel, "Wearable Skin Deformation Feedback for Force Sensory Substitution in Virtual Reality", Retrieved From: https://web.archive.org/web/20141114233415/https:/www.samuelschorr.com/research.html, Nov. 14, 2014, 8 Pages.
Shintake, et al., "Versatile Soft Grippers With Intrinsic Electroadhesion Based Onmultifunctional Polymer Actuators", In Journal of Advanced Materials, vol. 28, Issue 2, Jan. 2016, pp. 1-28.
Ye, et al., "Force-Sensing Glove System for Measurement of Hand Forces during Motorbike Riding", Retrieved from: http://journals.sagepub.com/doi/full/10.1155/2015/545643, Nov. 29, 2015, pp. 1-9.
Ying, et al., "Visualization Bio-Mimetic Model of Muscular Drive", In Proceedings of IEEE International Symposium on Industrial Electronics, Jun. 4, 2007, 3 Pages.
"Final Office Action Issued in U.S. Appl. No. 15/620,672", dated Nov. 26, 2019, 46 Pages.
"International Search Report and Written Opinion Issued in PCT Application No. PCT/US2019/038847", dated Oct. 2, 2019, 11 Pages.
"International Search Report and Written Opinion Issued in PCT Application No. PCT/US2019/038833", dated Nov. 5, 2019, 21 Pages.
"Non Final Office Action Issued in U.S. Appl. No. 15/968,677", dated Apr. 9, 2020, 30 Pages.
"Non Final Office Action Issued in U.S. Appl. No. 16/046,708", dated Mar. 2, 2020, 9 Pages.
"Non Final Office Action Issued in U.S. Appl. No. 16/123,682", dated Apr. 24, 2020, 15 Pages.
"Non Final Office Action Issued in U.S. Appl. No. 16/124,834", dated Mar. 23, 2020, 15 Pages.
"Non Final Office Action Issued in U.S. Appl. No. 16/422,801", dated Mar. 11, 2020, 14 Pages.
"Final Office Action Issued in U.S. Appl. No. 16/422,801", dated Jun. 22, 2020, 23 Pages.
"Non Final Office Action Issued in U.S. Appl. No. 16/422,611", dated Jul. 9, 2020, 7 Pages.
"Final Office Action Issued in U.S. Appl. No. 16/046,708", dated Aug. 3, 2020, 11 Pages.
"Notice of Allowance issued in U.S. Appl. No. 16/123,682", dated Aug. 4, 2020, 11 Pages.
"International Search Report and Written Opinion Issued in PCT Application No. PCT/US20/026953", dated Jul. 6, 2020, 12 Pages.
Hinchet, et al., "DextrES: Wearable Haptic Feedback for Grasping in VR via a Thin Form-Factor Electrostatic Brake", In Proceedings of the 31st Annual ACM Symposium on user Interface Software and Technology, Oct. 14, 2018, pp. 901-912.
"International Search Report and Written Opinion issued in PCT Application No. PCT/US2020/028379", dated Jul. 31, 2020, 10 Pages.
"Final Office Action Issued in U.S. Appl. No. 16/124,834", dated Sep. 28, 2020, 21 Pages.

\* cited by examiner

GUIDE FOR SUPPORTING FLEXIBLE ARTICULATING STRUCTURE

BACKGROUND

A state-of-the-art virtual reality (VR) or mixed reality (MR) holographic display system may immerse a user in a convincing alternative reality, where visual and auditory aspects of virtual objects are represented in a true-to-life manner. However, VR and MR systems may fail to provide an equally satisfying tactile experience—i.e., an experience in which virtual objects feel like the real objects they represent. True-to-life tactile simulation is also valuable in numerous other application areas besides VR and MR.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to clutching systems configured to simulate tactile interactions. One example provides a system for selectively restricting motion of an articulable joint. The system comprises a base having a first portion configured to be positioned at a first side of the articulable joint and a second portion configured to be positioned at a second side of the articulable joint, a clutch mechanism comprising a flexible portion having a first end coupled to the first portion of the base and a second end coupled to the second portion of the base, and a guide coupled to the base, the guide comprising a support surface that supports the flexible portion between the first end and the second end as the flexible portion moves during articulation of the articulable joint, the support surface of the guide comprising an angular transition in a dimension transverse to a travel direction of the flexible portion as a function of distance along the travel direction.

DETAILED DESCRIPTION

As mentioned above, VR and AR display systems may fail to provide a satisfying tactile experience. Thus, to provide haptic feedback to accompany a VR or MR experience, another wearable device, such as a glove device, may be worn to selectively restrict motion of an articulable joint, such as a finger joint, and thereby provide a sensation of touching a virtual object in a VR or MR experience. Various clutch mechanisms may be used, including electrostatic and mechanical mechanisms (pneumatic, cable-driven, etc.). Such clutching mechanisms may include a flexible portion "(artificial tendon)" configured to span an articulable joint from a first attachment point at a first side of the articulable joint to a second attachment point at a second side of the articulable joint. Such attachment points may be located on surfaces that are angularly offset from one another. For example, a surface normal backside of a palm and a surface normal of a dorsal side of the forefinger may be angularly offset from one another by approximately 10 degrees. Thus, the flexible portion of the clutch mechanism may experience side-to-side motion that causes it to "slip off" an articulable joint (e.g. a metacarpophalangeal joint) of the finger during flexion. Further, the artificial tendon may buckle away from the joint during extension of the joint. Similar issues may exist in other applications for clutching mechanisms, such as for soft robotic tendon/cable tracks. Similar issues may arise in soft robotic applications, as a soft robotic tendon may span a joint that causes motion of the tendon in a direction other than along a length of the tendon during joint movement.

To help prevent such slippage and buckling, a clutch mechanism may include a guide positioned to be located over the joint during use, wherein the guide is configured to constrain travel of the artificial tendon along a single axis. However, any angular offset between attachment points of the artificial tendon on different sides of the articulable joint may cause the artificial tendon to be pushed against an interior side of the guide as it travels through the guide. This force may result in friction between the artificial tendon and the interior side of the guide.

Thus, examples are disclosed that relate to a guide configured to transition an artificial tendon of a clutch mechanism between two angularly offset planes. As described in more detail below, the disclosed examples help to avoid the artificial tendon being pushed against a side of the guide during joint motion, which may reduce friction of the artificial tendon against the side of the guide, and also may help to prevent buckling of the flexible portion during finger extension.

Figure 1:
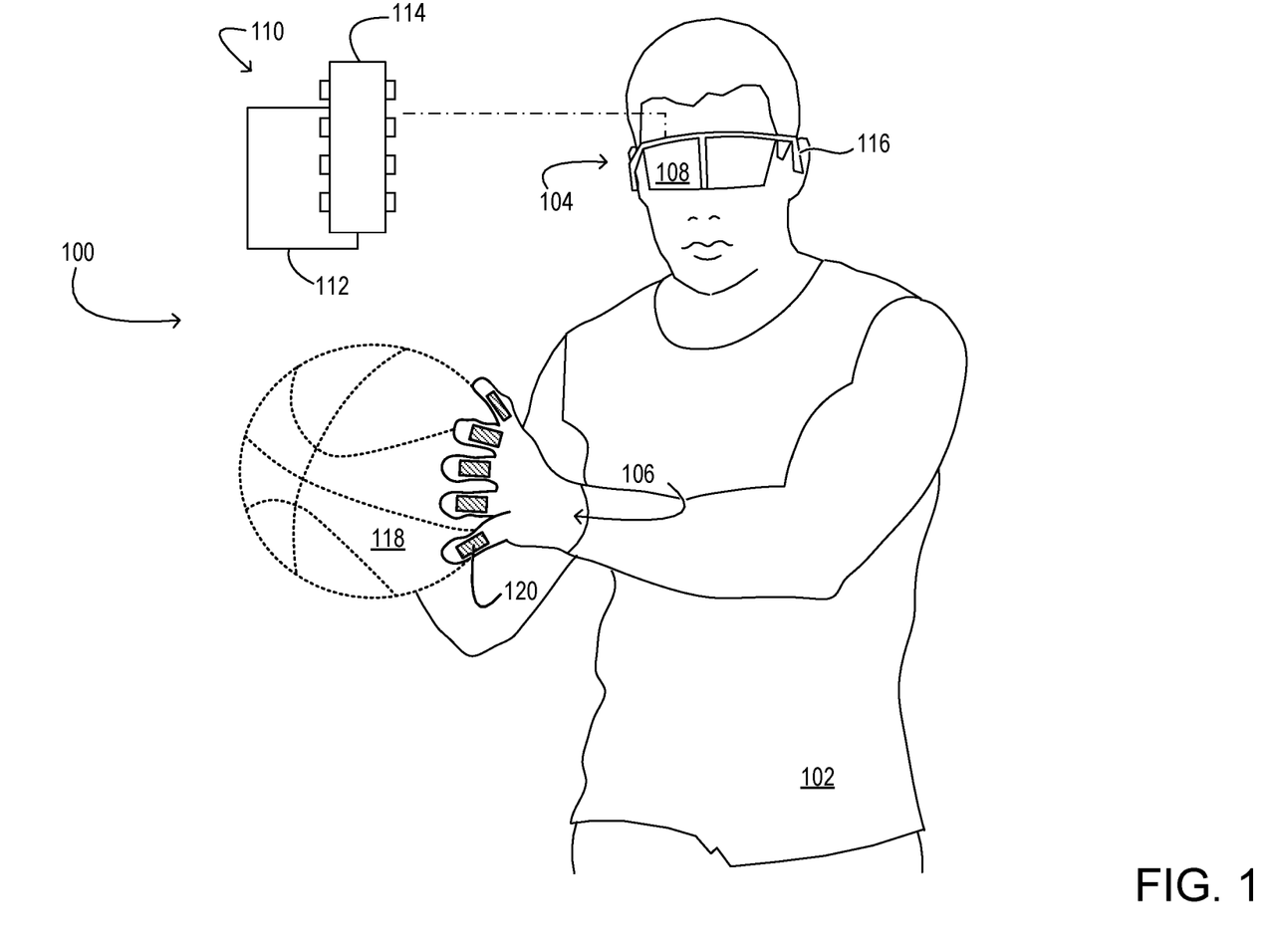
FIG. 1 shows an example use scenario in which a system for selectively restricting motion of an articulable joint is used to simulate a tactile interaction with a virtual object.

Prior to discussing example guides, FIG. 1 shows aspects of an example display system 100 configured to present an augmented or virtual reality environment to a user 102. The display system 100 is illustrated as being used to support gameplay, but may be used in numerous other scenarios as well. Display system 100 includes a head-mounted display (HMD) device 104 and a system 106 for selectively restricting motion of an articulable joint. HMD device 104 includes a near-eye display 108 configured to display virtual imagery in the user's field of view. In some examples, the near-eye display 108 is a see-through display, enabling real-world and virtual imagery to be admixed in the user's field of view. In other examples, the near-eye display 108 is opaque, providing a fully immersive virtual reality. In the HMD device 104, signals encoding the virtual display imagery are sent to the display 108 via an on-board computing device 110. Computing device 110 includes at least one processor 112 and associated memory 114, examples of which are described below with reference to FIG. 9. HMD device 104 further includes loudspeakers 116 that enable the user 102 to experience immersive audio.

Leveraging communications componentry arranged in the HMD device 104, the computing device 110 may be communicatively coupled to one or more off-board computing devices via a network. Thus, the virtual display imagery that the user 102 sees may, in some examples, be composed and/or rendered by an off-board computing device and sent wirelessly to the computing device 110. In other examples, the virtual display imagery may be composed and rendered on-board.

The system 106 for selectively restricting motion of an articulable joint is configured to further augment the augmented, mixed, or virtual reality experience by providing a lifelike physical sensation responsive to user interaction with virtual imagery. In the example shown in FIG. 1, the system 106 comprises a wearable apparatus in the form of a glove, which is worn on the hand of the user 102. In other examples, the system 106 for selectively restricting motion of an articulable joint may take the form of a different wearable apparatus, such as sleeve worn around an arm, a leg, foot, and/or another body part. In yet other examples, the system 106 for selectively restricting motion of an articulable joint may take the form of a non-wearable device (e.g. in robotics and soft robotics implementations).

Continuing with FIG. 1, the system 106 may be configured to provide a mechanically resistive physical sensation in response to detection of contact between the body of the user 102 and a virtual display object projected into a field of view of the user 102. In the example shown in FIG. 1, the mechanically resistive physical sensation may be provided whenever the hand of the user 102 intersects virtual basketball 118, such as to simulate a grip on the virtual basketball 118. In some examples, the mechanically resistive physical sensation provided by the system 106 upon user interaction with a virtual display object may vary based on the virtual display object, such that the user 102 is provided different tactile experiences for interactions with different virtual objects (e.g. a virtual pillow compared to a virtual table). In other examples, a mechanically resistive physical sensation may be provided based upon any other suitable trigger, in addition or alternatively to interaction with a virtual display object.

Figure 2:
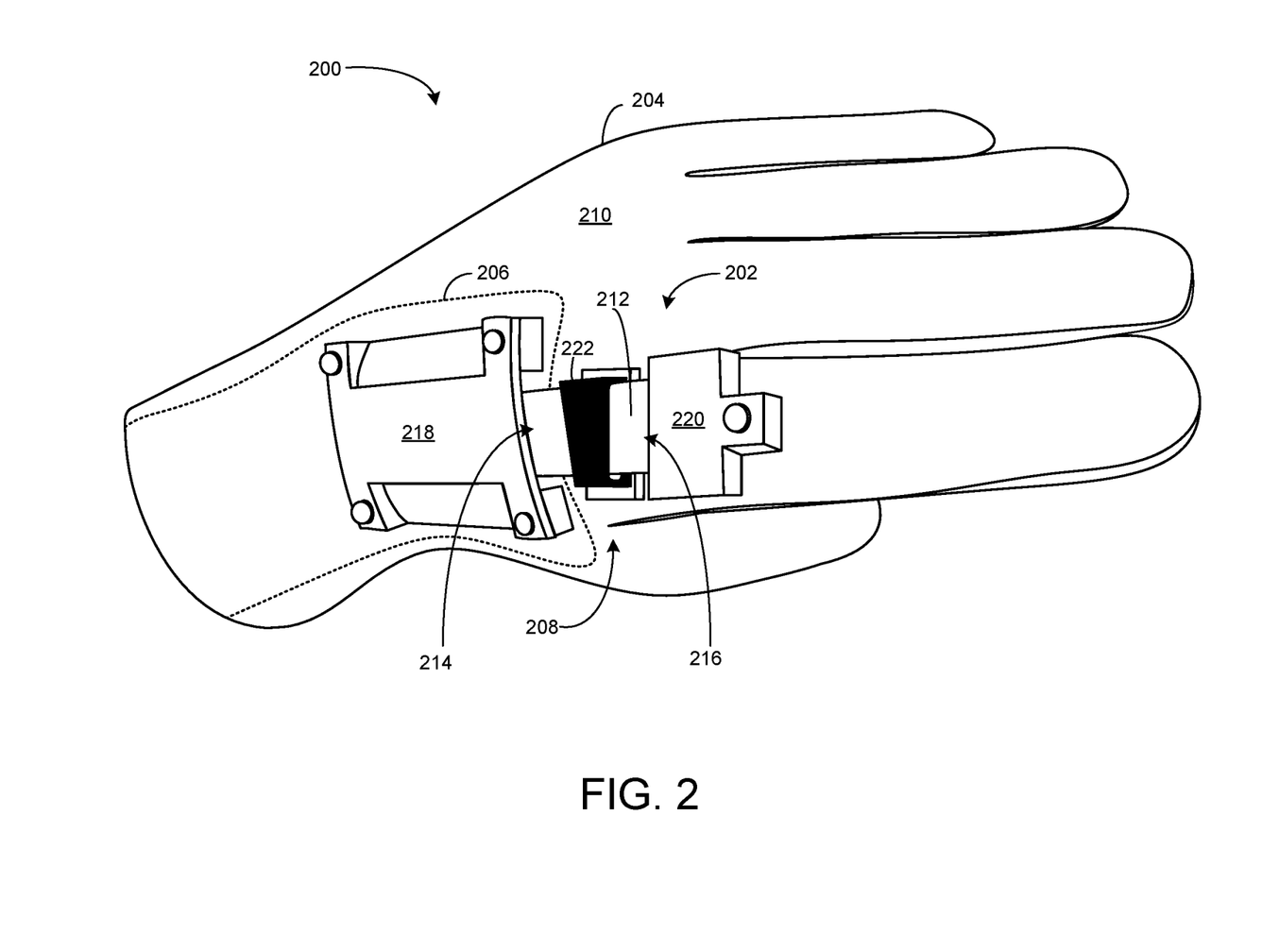
FIG. 2 schematically shows an example wearable apparatus comprising a clutch mechanism.

To simulate the sensation of the touch of a virtual object on the user's hand, the system 106 includes at least one clutch mechanism 120. FIG. 2 schematically shows aspects of an example wearable apparatus 200 that may be used as the system 106 in FIG. 1. The wearable apparatus 200 comprises a clutch mechanism 202 coupled to a base 204. In this example, a single clutch mechanism 202 controls motion restriction for a single joint—a metacarpophalangeal joint of a forefinger. In other examples, two or more clutch mechanisms may be provided such that different clutch mechanisms restrict motion of different joints. In yet other examples, a single clutch mechanism may control motion restriction for multiple joints (e.g. plural joints in a finger).

The base 204 may take the form of a textile layer or other flexible layer, and comprises a first portion 206 configured to be positioned at a first side of an articulable joint 208 (a metacarpophalangeal joint in this example), and a second portion 210 configured to be positioned at a second side of the articulable joint 208. In some examples, the first portion 206 may comprise a less-stretchable material (e.g. a woven textile), and the second portion 210 may comprise a more stretchable material (e.g. a knit textile).

The clutch mechanism 202 includes a flexible portion 212 (which, as mentioned above, also may be referred to as an artificial tendon) having a first end 214 coupled to the first portion 206 of the base 204 and a second end 216 coupled to the second portion 210 of the base 204. In the example of FIG. 2, the first end 214 is coupled to the first portion 206 via a first housing 218 and the second end 216 is coupled to the second portion 210 via a second housing 220, but may be attached via other mechanisms in other examples. The use of a less stretchable material to form first portion 206 of the base 204 may help the first end 214 to maintain a relatively static position with respect to a wrist during device use.

In the example shown in FIG. 2, the clutch mechanism 202 comprises an electrostatic clutch that is controllable to change a frictional force between a first electrode and a second electrode (collectively referred to as the flexible portion 212 in FIG. 2) by controlling an electrostatic force between the first and second electrodes, where the first electrode and second electrode at least partially overlap one another and are moveable translationally with respect to each other. In other examples, any other suitable clutch mechanism may be used, such as a motor and cable system in which a motor controls a length of a cable that spans a joint.

Figure 3A:
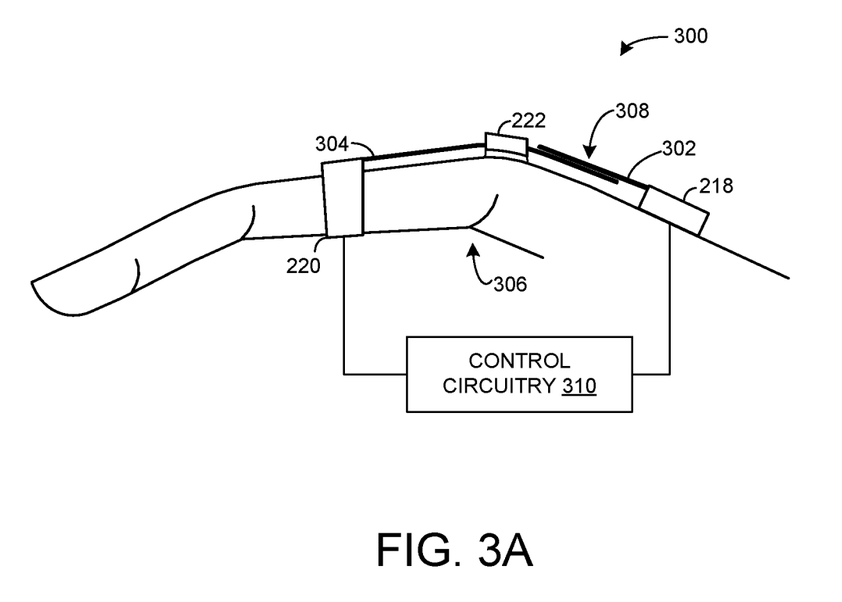
FIGS. 3A and 3B schematically show an example electrostatic clutch mechanism during extension and flexion, respectively, of an articulable joint.
Figure 3B:
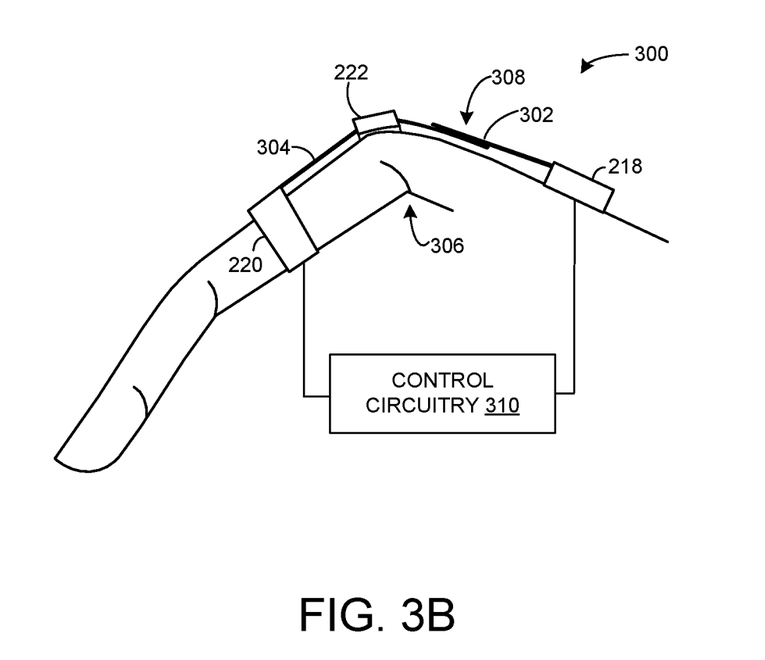

FIG. 3A schematically depicts an example electrostatic clutch 300 comprising a first electrode 302 and a second electrode 304 that may be used to form the flexible portion 212 in FIG. 2. The second electrode 304 is configured to move translationally relative to the first electrode 302 based upon flexion and extension of an articulable joint 306, during which an overlapping region 308 of the first electrode 302 and the second electrode 304 shortens and lengthens, respectively. As shown in FIG. 3B, the overlapping region 308 shortens based upon flexion of the articulable joint 306. The overlapping region of the first electrode 302 and second electrode 304 may be contained fully within the first housing 218 (not shown here for clarity) such that only the second electrode 304 travels through the guide 222 and relative movement between the first electrode 302 and the second electrode 302 occurs entirely within the first housing 218. In other examples, both the first electrode 302 and the second electrode 304 may travel through the guide. Further, while shown in FIGS. 3A and 3B as single electrode sheets, the first electrode 302 and second electrode 304 may comprise multiple layers in an interdigitated arrangement.

Control circuitry 310 is configured to generate a control signal to control an electrostatic force between the first electrode 302 and the second electrode 304. In one specific example, the control circuitry 310 comprises a controller (e.g. a microcontroller (MCU)), a waveform generator, a hysteretic DC/DC voltage converter, and an amplifier configured to generate a waveform of suitable voltage to apply to the electrodes to create a desired electrostatic clutching effect. In other examples, any other suitable control circuitry 310 may be used. The control circuitry 310 may be implemented as multiple discrete components, an application-specific integrated circuit (ASIC), a system-on-chip (SoC), or in any other suitable form.

Figure 4:
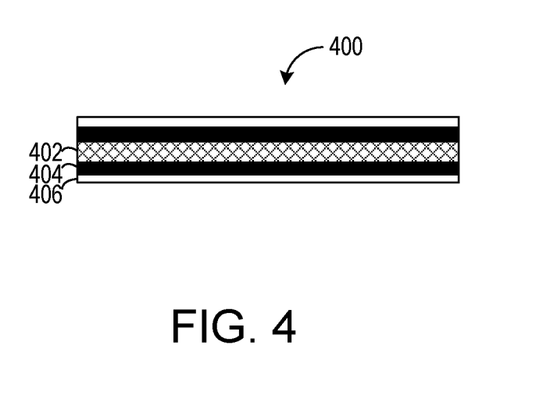
FIG. 4 schematically shows an example electrode usable in the electrostatic clutch mechanism of FIGS. 3A and 3B.

FIG. 4 depicts an example electrode sheet 400. The electrode sheet 400 includes a polymer core 402, a conductive material 404 arranged on either side of the core 402, and a dielectric coating 406 covering each layer of the conductive material 404. The core 402 may be formed from any suitable flexible materials, such as a fabric material or polymer film (e.g. bi-axially oriented polyethylene terephthalate (BOPET), polyimide, etc.). The conductive material 404 may comprise any suitably electrically conductive material (e.g. graphite, silver, copper, aluminum, etc.), and the dielectric coating 406 may comprise any suitable thickness and material to achieve a suitably strong electrostatic force at a given voltage. In some examples, the dielectric coating 406 comprises a high dielectric constant material, such as barium titanate, contained within a suitable binder.

Returning to FIG. 2, the wearable apparatus 200 further comprises a guide 222 coupled to the base 204. The guide comprises a support surface that supports the flexible portion 212 between the first end 214 and the second end 216 as the flexible portion 212 moves during joint articulation. The support surface of the guide 222 comprises an angular transition in a dimension transverse to a travel direction of the flexible portion 212 as a function of distance along the travel direction, to compensate for an angular offset between the backside of the palm (to which the first end 214 of the flexible portion 212 is coupled) and the dorsal surface of the forefinger (to which the second end 216 of the flexible portion 212 is coupled).

Figure 5:
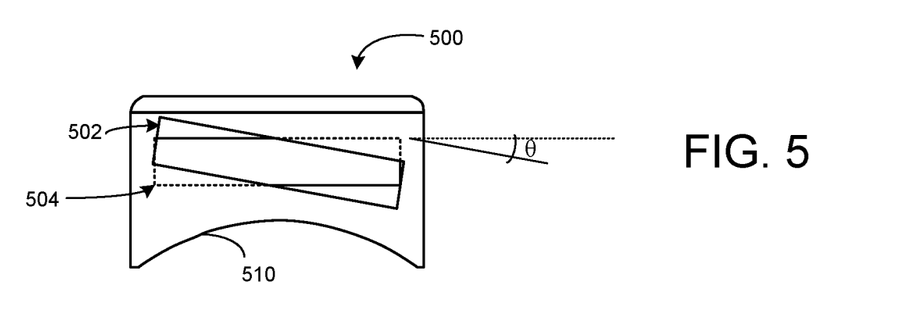
FIG. 5 shows an example guide for guiding an artificial tendon of a clutch mechanism through an angular transition.
Figure 6:
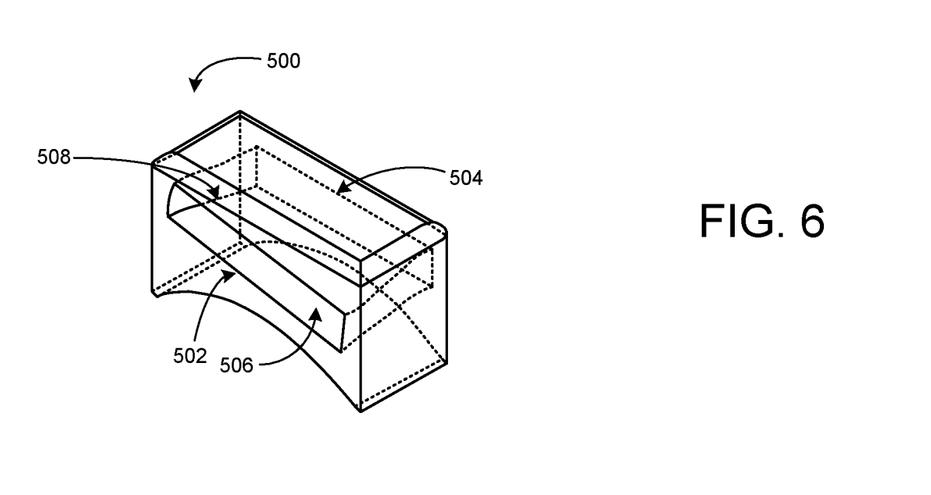
FIG. 6 shows a perspective view of the example guide of FIG. 5.

FIGS. 5 and 6 schematically show an example guide 500 usable as the guide 222 in FIG. 2. In this example, the guide 500 includes a solid structure that includes a first face comprising a first opening 502, a second face comprising a second opening 504, and a support surface 506 extending between the first opening 502 and the second opening 504. The second opening 504 is angularly offset from the first opening 502 by an angle $\theta$, where $\theta$ may be selected based upon an angular offset between surface normals at different attachment points of an artificial tendon. In one specific example, the guide 500 comprises an angular offset $\theta$ of approximately 10°, which may help to compensate for the angular offset between a curved plane of a backside of a palm and a dorsal surface of a forefinger when the guide is positioned at an apex of the metacarpophalangeal joint of the forefinger.

Figure 7:
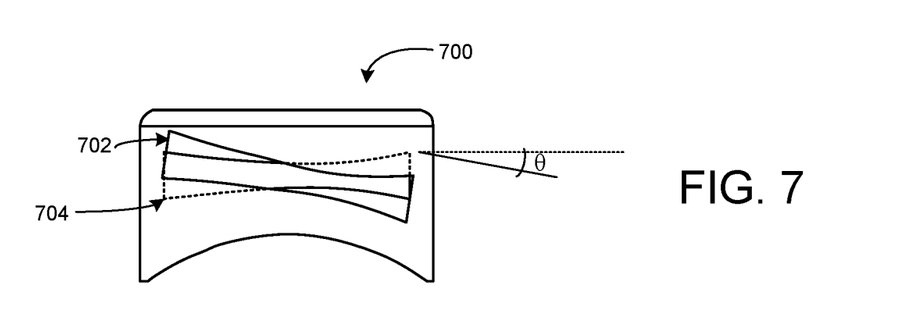
FIG. 7 depicts an example guide in which a support surface has a curvature at an opening of the guide.

In FIGS. 5 and 6, the first opening 502 and the second opening 504 of the guide 500 each comprise a rectangular cross-section configured to contain an artificial tendon having a rectangular cross-section. In other examples, the first and second openings of a guide may comprise any other suitable cross-sectional shape for containing any corresponding artificial tendon (e.g. a cable having a circular cross-section). Further, in some examples, the support surface at first opening 502 and/or at the second opening 504 of the guide may have curvature instead of being linear. One such example guide 700 is shown in FIG. 7, in which a support surface and an upper interior surface (an interior surface opposite of the support surface) at each opening 702, 704 comprise curvature. This may help to compensate for multi-axis bending of an articulable joint, such as a thumb joint, by having an angular range of surface normals to oppose the force exerted by the artificial tendon from different directions.

The support surface 506 at each opening 502, 504 has a surface normal that is aligned with a force exerted on that portion of the support surface during joint flexion. Further, an upper interior surface of the guide 500 may also comprise an angular transition to help prevent lateral motion of the artificial tendon during joint extension. In this manner, the angular transition 508 may help to mitigate frictional losses associated with lateral motion of the artificial tendon during joint flexion and extension.

The angular transition 508 may be implemented via any suitable structure extending between first opening 502 and the second opening 504 within the guide 500. In some examples, the angular transition 508 comprises a continuous transition, such as one determined via a spline interpolation or other interpolation between the first opening 502 and the second opening 504. In other examples, the support surface may have a stepped transition (in one or multiple angular steps), or other discontinuous transition.

A shape of the guide 500 may be influenced by a shape of an articulable joint on which the guide 500 is configured to be positioned. For example, a mounting surface 510 of the guide 500 may comprise a curvature based on a shape of a corresponding surface of an articulable joint. In FIG. 5, the mounting surface 510 of the guide 500 comprises a curvature based on a shape of a metacarpophalangeal joint of the forefinger.

The guide 500 may be formed from any suitable material, including various polymers, metals, ceramics, and composite materials. In one specific example, the guide 500 is formed from acrylonitrile butadiene styrene (ABS). Further, the support surface 506 (and potentially adjacent surfaces that may contact the artificial tendon during use) may comprise a coating, such as a polytetrafluoroethylene (PTFE) coating, or other surface treatment (e.g. application of an adhesive tape) comprising a lower coefficient of friction than the material from which the guide 500 is formed. Additionally, in some examples, an artificial tendon may include a surface layer of a material (e.g. PET film) comprising a lower coefficient of friction than the material from which an artificial tendon is formed.

Figure 8:
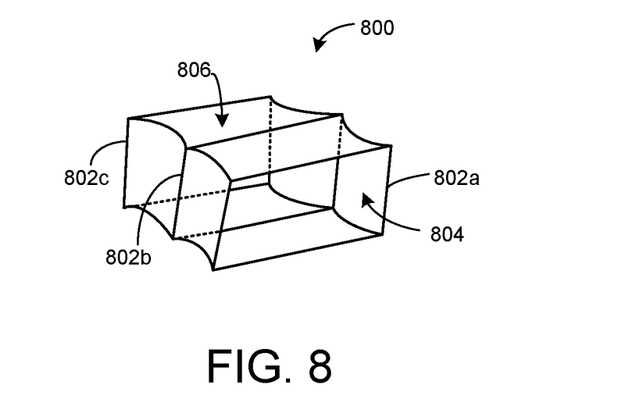
FIG. 8 shows an example guide comprising a bellows structure configured to flex with movement of an articulable joint.

In some examples, a guide may comprise a deformable structure that can change shape as the joint moves. FIG. 8 schematically depicts an example guide 800 comprising a bellows structure that allows the guide to flex with movement of a joint. The guide 800 comprises n body structures (802a through 802c in FIG. 8) connected by deformable sides (two of which are shown at 804 and 806 in FIG. 8), where n is greater than or equal to 2. The n body structures may be configured to provide rigid contact points that support an artificial tendon as the artificial tendon moves through the guide (e.g. through a channel formed by the body structures 802a through 802c in FIG. 8). While depicted as having three body structures 802a through 802c in FIG. 8, a guide may comprise any other suitable number of body structures.

The body structures 802a through 802c may be formed from any suitable material. Examples of materials suitable for use as the n body structures include polymers (e.g. ABS, polyethylene terephthalate (PET), thermoplastic polyurethane (TPU), etc.), metals, ceramics, and composite materials. While depicted in FIG. 8 as having a rectangular profile, the n body structures may comprise any other suitable cross-sectional shape in other examples.

As mentioned above, the n body structures are connected by deformable sides that form a bellows structure. In some examples, the deformable sides 804 may comprise a flexible material, such as a fabric/textile, or a flexible polymer. As more specific examples, the deformable sides 804 may comprise a molded polymer tubing in which the n body structures are embedded, or a polymer sheet material (e.g. PET, TPU, etc.) folded to form a bellows structure. Further, while the n body structures and the deformable sides are described herein as separate, joined components, a guide having a bellows structure may include such features in a unitary component.

Figure 9:
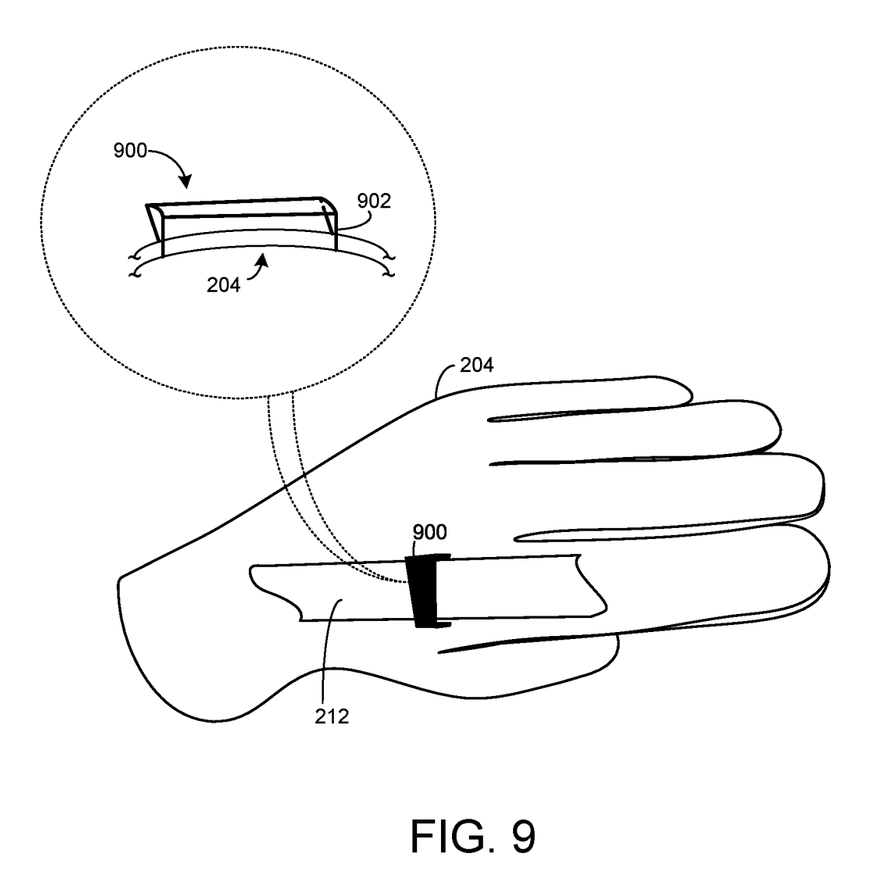
FIG. 9 depicts an example guide omitting a supporting surface and comprising an angular transition along an upper interior surface.

In other examples, a guide may omit a support surface, but be configured to prevent lateral motion of the artificial tendon and to prevent buckling during joint extension. In such examples, an upper interior surface of the guide may comprise an angular transition as discussed above. FIG. 9 depicts an example guide 900 wherein a rectangular cross-section opening 902 includes three sides rather than four, and a base (e.g. base 204) serves as a fourth side of the opening. In such a guide, the support surface is omitted, but side surfaces help prevent slippage of an artificial tendon 212 to the side, and an upper interior surface (opposing the base 204) may be configured to help prevent buckling of the artificial tendon 212 during joint extension.

While depicted in FIG. 2 as a clutch mechanism configured to be disposed over a single joint of a finger, a clutch mechanism may also be configured to extend across multiple joints, such as multiple joints of a same finger, and guides as described herein may be positioned over each of the multiple joints.

No aspect of the foregoing description should be understood in a limiting sense, for numerous variations, extensions, and omissions are contemplated as well. In some configurations, for example, a clutch mechanism and a guide may be used in medical, rather than virtual or mixed reality applications. Controllable joint motion restriction may be useful for a patient rehabilitating from a skeletomuscular injury, or a brain injury such as a stroke. In other examples, a clutch mechanism may be used as an active restraint for management of seizures or potentially dangerous body movements associated with autism, psychiatric disorders, or acute substance abuse.

A clutch mechanism comprising a guide may also be amenable to various industrial-safety applications. In one example, machine vision or other environment-sensing componentry may be used to assess whether persons are in close proximity to potentially dangerous machinery. Persons wearing an appropriate clutch mechanism operatively coupled to the environment-sensing componentry may be protected from drawing too close to the machinery, extending a hand or finger into a cutting device, etc. In other examples, a clutch mechanism worn by a worker may be configured for skeletal strain mitigation. When the worker is carrying a heavy object, the clutch mechanism may lock into place, providing additional resistance to motion and relieving stress on the worker's fingers, wrists, arms, legs, and other skeletal joints.

Another example provides a system for selectively restricting motion of an articulable joint, the system comprising a base having a first portion configured to be positioned at a first side of the articulable joint and a second portion configured to be positioned at a second side of the articulable joint, a clutch mechanism comprising a flexible portion having a first end coupled to the first portion of the base and a second end coupled to the second portion of the base, and a guide coupled to the base, the guide comprising a support surface that supports the flexible portion between the first end and the second end as the flexible portion moves during articulation of the articulable joint, the support surface of the guide comprising an angular transition in a dimension transverse to a travel direction of the flexible portion as a function of distance along the travel direction. In such an example, the guide may additionally or alternatively comprise a bellows structure. In such an example, the flexible portion may additionally or alternatively comprise a rectangular cross-section. In such an example, the flexible portion may additionally or alternatively comprise a cable. In such an example, the angular transition may additionally or alternatively comprise a continuous transition. In such an example, the guide may additionally or alternatively comprise a mounting surface having a curvature based on a shape of a corresponding surface of the articulable joint. In such an example, the base may additionally or alternatively comprise a textile material. In such an example, the first portion of the base may additionally or alternatively comprise a more stretchable material than the second portion of the base. In such an example, the base may additionally or alternatively comprise a glove.

Another example provides a wearable apparatus, comprising a base comprising a first portion configured to be positioned at a first side of the articulable joint and a second portion configured to be positioned at a second side of the articulable joint, a clutch mechanism comprising a flexible portion having a first end coupled to the first portion of the base and a second end coupled to the second portion of the base, and a guide coupled to the base, the guide comprising a support surface that supports the flexible portion between the first end and the second end as the flexible portion moves during articulation of the articulable joint, the support surface of the guide comprising an angular transition between the first end and the second end in a dimension transverse to a travel direction of the flexible portion as a function of distance along the travel direction. In such an example, the guide may additionally or alternatively comprise a bellows structure. In such an example, the flexible portion may additionally or alternatively comprise a rectangular cross-section. In such an example, the flexible portion may additionally or alternatively comprise a cable. In such an example, the angular transition may additionally or alternatively comprise a continuous transition. In such an example, the guide may additionally or alternatively comprise a mounting surface having a curvature based on a shape of a corresponding surface of the articulable joint. In such an example, the base may additionally or alternatively comprise a textile material. In such an example, the first portion of the base may additionally or alternatively comprise a more stretchable material than the second portion of the base. In such an example, the wearable apparatus may additionally or alternatively comprise a glove.

Another example provides a wearable device, comprising a flexible base configured to be worn on an articulable joint, the flexible base comprising a first portion configured to be positioned at a first side of the articulable joint and a second portion configured to be positioned at a second side of the articulable joint, an electrostatic clutch, comprising a first electrode coupled to the first portion of the flexible base, and a second electrode coupled to the second portion of the flexible base, the second electrode at least partially overlapping the first electrode, control circuitry coupled to the electrostatic clutch and configured to generate a control signal to control an electrostatic force between the first electrode and the second electrode, and a guide coupled to the base, the guide comprising a support surface that supports the electrostatic clutch as the second electrode moves relative to the first electrode during articulation of the articulable joint, the support surface comprising an angular transition between the first end and the second end in a dimension transverse to a travel direction of the flexible portion as a function of distance along the travel direction. In such an example, the angular transition may additionally or alternatively comprise a continuous transition.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for selectively restricting motion of an articulable joint, the system comprising:
  a base having a first portion configured to be positioned at a first side of the articulable joint and a second portion configured to be positioned at a second side of the articulable joint;
  a clutch mechanism comprising a flexible portion having a first end coupled to the first portion of the base and a second end coupled to the second portion of the base; and
  a guide coupled to the base, the guide comprising a support surface that supports the flexible portion between the first end and the second end as the flexible portion moves during articulation of the articulable joint, the support surface of the guide comprising an angular transition in a dimension transverse to a travel direction of the flexible portion as a function of distance along the travel direction.

2. The system of claim 1, wherein the guide comprises a bellows structure.

3. The system of claim 1, wherein the flexible portion comprises a rectangular cross-section.

4. The system of claim 1, wherein the flexible portion comprises a cable.

5. The system of claim 1, wherein the angular transition comprises a continuous transition.

6. The system of claim 1, wherein the guide comprises a mounting surface having a curvature based on a shape of a corresponding surface of the articulable joint.

7. The system of claim 1, wherein the base comprises a textile material.

8. The system of claim 1, wherein the first portion of the base comprises a more stretchable material than the second portion of the base.

9. The system of claim 1, wherein the base comprises a glove.

10. A wearable apparatus, comprising:
  a base comprising a first portion configured to be positioned at a first side of the articulable joint and a second portion configured to be positioned at a second side of the articulable joint;
  a clutch mechanism comprising a flexible portion having a first end coupled to the first portion of the base and a second end coupled to the second portion of the base; and
  a guide coupled to the base, the guide comprising a support surface that supports the flexible portion between the first end and the second end as the flexible portion moves during articulation of the articulable joint, the support surface of the guide comprising an angular transition between the first end and the second end in a dimension transverse to a travel direction of the flexible portion as a function of distance along the travel direction.

11. The wearable apparatus of claim 10, wherein the guide comprises a bellows structure.

12. The wearable apparatus of claim 10, wherein the flexible portion comprises a rectangular cross-section.

13. The wearable apparatus of claim 10, wherein the flexible portion comprises a cable.

14. The wearable apparatus of claim 10, wherein the angular transition comprises a continuous transition.

15. The wearable apparatus of claim 10, wherein the guide comprises a mounting surface having a curvature based on a shape of a corresponding surface of the articulable joint.

16. The wearable apparatus of claim 10, wherein the base comprises a textile material.

17. The wearable apparatus of claim 10, wherein the first portion of the base comprises a more stretchable material than the second portion of the base.

18. The wearable apparatus of claim 10, wherein the wearable apparatus comprises a glove.

19. A wearable device, comprising:
  a flexible base configured to be worn on an articulable joint, the flexible base comprising a first portion configured to be positioned at a first side of the articulable joint and a second portion configured to be positioned at a second side of the articulable joint;
  an electrostatic clutch, comprising
    a first electrode coupled to the first portion of the flexible base, and
    a second electrode coupled to the second portion of the flexible base, the second electrode at least partially overlapping the first electrode;
  control circuitry coupled to the electrostatic clutch and configured to generate a control signal to control an electrostatic force between the first electrode and the second electrode; and
  a guide coupled to the base, the guide comprising a support surface that supports the electrostatic clutch as the second electrode moves relative to the first electrode during articulation of the articulable joint, the support surface comprising an angular transition between the first end and the second end in a dimension transverse to a travel direction of the flexible portion as a function of distance along the travel direction.

20. The wearable device of claim 19, wherein the angular transition comprises a continuous transition.

* * * * *